United States Patent
Jacobs et al.

(10) Patent No.: US 10,641,683 B2
(45) Date of Patent: May 5, 2020

(54) AUTOMATIC TRANSMISSION SHIFTING PERFORMANCE EVALUATION

(71) Applicant: TOYOTA MOTOR ENGINEERING & MANUFACTURING NORTH AMERICA, INC., Plano, TX (US)

(72) Inventors: Brian F. Jacobs, Alum Creek, WV (US); John A. Frazier, Fraziers Bottom, WV (US); Jason D. Carmichael, Ravenswood, WV (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 213 days.

(21) Appl. No.: 15/943,233

(22) Filed: Apr. 2, 2018

(65) Prior Publication Data
US 2019/0301972 A1    Oct. 3, 2019

(51) Int. Cl.
| | |
|---|---|
| G01M 13/02 | (2019.01) |
| G01M 13/022 | (2019.01) |
| G01M 13/025 | (2019.01) |
| G01M 13/021 | (2019.01) |
| B60W 10/115 | (2012.01) |

(52) U.S. Cl.
CPC ........ *G01M 13/022* (2013.01); *G01M 13/021* (2013.01); *G01M 13/025* (2013.01); *B60W 10/115* (2013.01)

(58) Field of Classification Search
CPC .. G01M 13/02; G01M 13/022; G01M 13/025; G01M 13/027
USPC ....................................................... 73/115.02
See application file for complete search history.

(56) References Cited

U.S. PATENT DOCUMENTS

| | | | |
|---|---|---|---|
| 5,085,071 A | | 2/1992 | Mizushina et al. |
| 6,754,603 B2 | | 6/2004 | Turbett et al. |
| 7,257,522 B2 | | 8/2007 | Hagiwara et al. |
| 7,672,773 B2 | | 3/2010 | Nakano et al. |
| 8,050,856 B2 | | 11/2011 | Duty et al. |
| 2004/0192500 A1 | * | 9/2004 | Tokura ............... F02C 7/36 477/109 |

(Continued)

FOREIGN PATENT DOCUMENTS

| | | |
|---|---|---|
| DE | 10 2005 061 527 B3 | 6/2007 |
| JP | 2017-40475 | 2/2017 |

*Primary Examiner* — Eric S. McCall
(74) *Attorney, Agent, or Firm* — Oblon, McClelland, Maier & Neustadt, L.L.P.

(57) ABSTRACT

A method and system of evaluating shift performance of an automatic transmission system having gears and a torque converter. The method includes driving the automatic transmission with an input motor while applying a rotational load by a pair of output motors. A command is applied to a solenoid to change fluid pressure, the time of issuance of the command is recorded, and the transmission shifts between a pair of the gears. Periodic measurements are made for transmission output torque. Threshold values are determined for the torque converter rotation speed and for the transmission output torque. A lag time is determined between the threshold for the turbine speed and the detected time for the solenoid. An engage time is determined based on the torque threshold and the turbine speed threshold. Lag time, peak transmission, and output torque are used to judge performance of the automatic transmission system.

20 Claims, 14 Drawing Sheets

(56) References Cited

U.S. PATENT DOCUMENTS

| | | | |
|---|---|---|---|
| 2010/0004835 A1* | 1/2010 | Kuwahara | B60W 10/06 701/59 |
| 2019/0162303 A1* | 5/2019 | Kato | F16H 61/702 |
| 2019/0285146 A1* | 9/2019 | Tsukamoto | F16H 61/04 |

* cited by examiner

AUTOMATIC TRANSMISSION SHIFTING PERFORMANCE EVALUATION

FIELD OF DISCLOSURE

The present disclosure relates generally to a performance evaluation system for an automatic transmission, and is particularly applicable to evaluation of a transmission having eight gears.

BACKGROUND

An automatic transmission, or transaxle, sits between an engine, typically an internal combustion gasoline engine or diesel engine, and a rotating wheel axle, and transfers power from the engine to the axle of a vehicle. An automatic transmission includes a torque converter that is a fluid coupling that enables the engine to continue to rotate independently of the transmission. When the engine speeds up, more fluid is pumped into the torque converter, causing more torque to be transmitted to the wheel axle. When the engine is rotating slowly, such as when the car is idling at a spotlight, the amount of torque transmitted to the wheel axle is very small. Some torque converters include a lockup mechanism that binds the engine to the transmission when their speeds are nearly equal, to avoid slippage and a resulting loss of efficiency. The automatic transmission automatically changes gear ratios as the vehicle moves in order to provide a range of speed and torque outputs. Typical gear ratios can range from 4-speed, and up to 10-speed. Having a greater number of gears can provide a smoother transition between gears, but can also lead to a more complex transmission system.

An automatic transmission has an associated set of performance standards that it is required to meet. An automatic transmission with a greater number of gears has greater complexity, making achieving performance standards more difficult. Failure or wear of components in sections of the automatic transmission can prevent the system as a whole from achieving the expected level of performance. Tests may be used to determine if the automatic transmission is within the performance standards. In particular, tests may be performed during manufacturing to determine quality of the transmission. Also, tests may be performed for troubleshooting a transmission returned under warranty.

However, it is a difficult and time consuming task to determine what component, or components, may be the reason that the expected performance level of an automatic transmission is unable to be achieved. Test results are complex and require a highly trained person to analyze the results and determine possible components that may be the cause of poor performance. For example, test results can consist of several hundred values for various parameters, for which the values are meaningless without some understanding of the values that parameters are expected to have under specific conditions.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a graph of an example performance measurement of a torque converter with lockup on;

DETAILED DESCRIPTION

Figure 1:
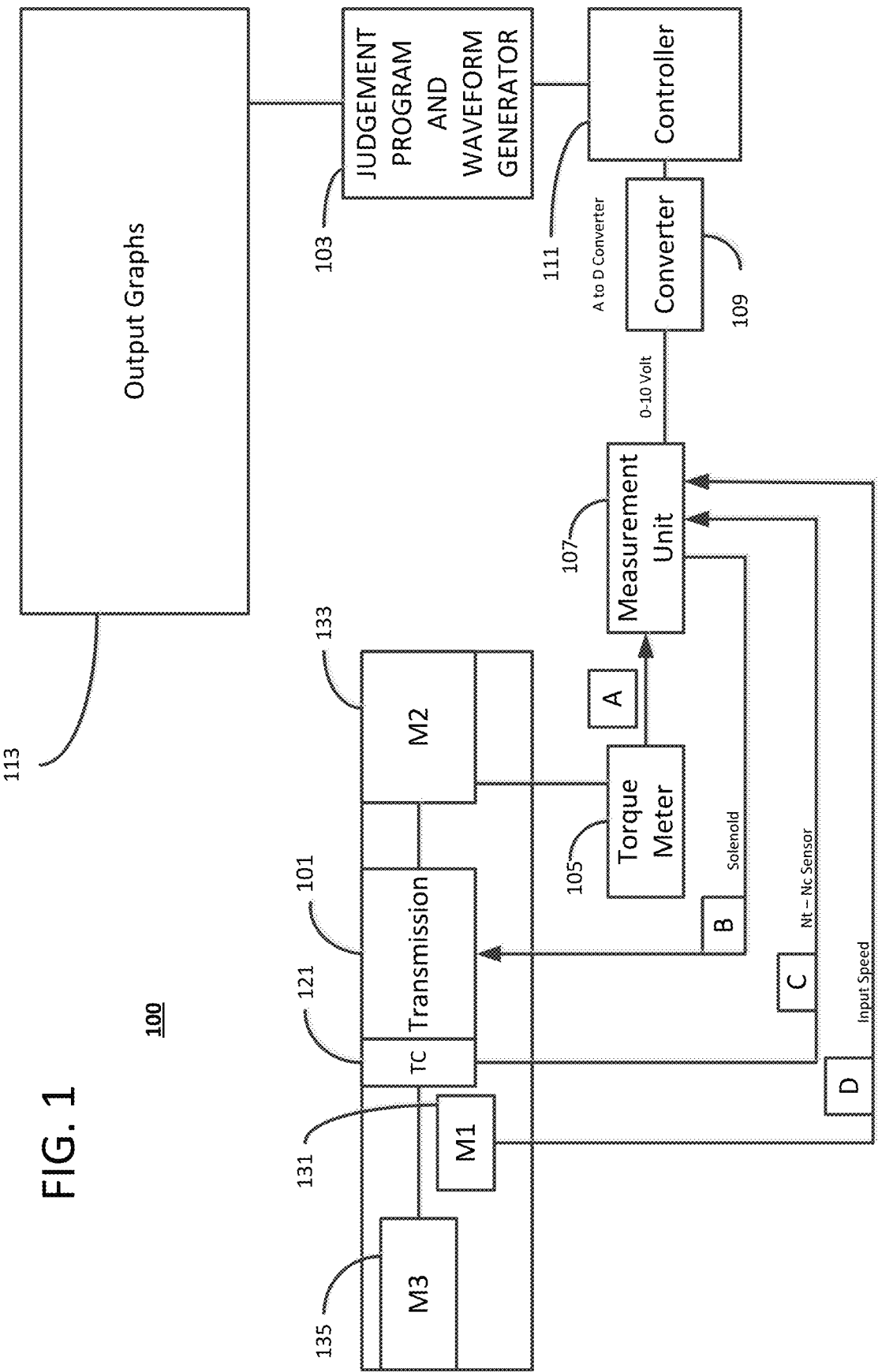
FIG. 1 is a block diagram of a test stand according to an exemplary aspect of the disclosure.

Referring now to the drawings, wherein like reference numerals designate identical or corresponding parts throughout several views, the following description relates to a test system and method for evaluation of shifting performance in an automatic transmission system.

The disclosed embodiments provide a testing system and method that may be used by a person that is inexperienced in evaluating performance of an automatic transmission. The test system and method may be used to determine components of an automatic transmission that may be the reason that the transmission is unable to meet performance requirements. The testing system performs an automated analysis while an automatic transmission is being operated in a controlled manner that performance requirements are evaluated in a single session, including testing operation in neutral, testing operation of torque converter lockup, testing transition between all gears. The testing system performs automated analysis in a manner that is consistent and reproducible between comparable transmission systems, as well as, for different types of transmission systems.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

FIG. 1 is a block diagram for a test stand according to an exemplary aspect of the disclosure. The test stand 100 includes three motors, an input motor M1 131, and output motors M2 133 and M3 135 which apply a simulated road load. The input motor M1 131 may be a motor that the transmission is expected to be paired with in a vehicle. For example, the input motor M1 131 may be a six-cylinder gasoline engine. The output motors M2 133 and M3 135 may be sized based on the vehicle that the transmission is expected to be used in. A rotational speed sensor D monitors input rotational speed (rpm) provided by the input motor M1 131. A transmission 101 sits between input motor M1 131 and output motors M2 133 and M3 135. A torque meter 105 measures torque applied to output motor M2 133. The transmission 101 includes one or more solenoids for controlling fluid flow in the transmission 101. A torque converter 121 associated with the transmission 101 has rotational speed sensors for detecting speed differential between the turbine (NT) and the counter drive (NC) of the torque converter 121. The test stand 100 may include an automatic measuring system consisting of a measurement unit 107, analog-to-digital (A/D) conversion 109, and a controller 111. The controller 111 may perform an application, referred to herein as a judgement program and waveform generator 103, which among other things, generates graphs 113 based on measurements. In some cases, the controller 111 may be a desktop computer running a standard operating system, such as Windows® 7 Professional 32-bit or Windows® 7 Professional 64-bit. The controller may be implemented by one or more processing circuits. A processing circuit includes a programmed processor, as a processor includes circuitry. A processing circuit may also include devices such as an application specific integrated circuit (ASIC) and conventional circuit components arranged to perform the recited functions.

The measurement unit 107 periodically samples analog and digital signals from various sensors, including the input rotational speed sensor D, Nt and Nc rotational speed sensors, and performs operations on the signals and outputs the signals to controller 111. In an exemplary aspect, a sensor signal is 10 KHz and is continuously sampled at a fraction of a second. In the case of analog sensor signals, an A/D converter 109 converts the signals to digital signals before providing the signals to the controller 111. The measurement unit 107 sends a solenoid command to one or more transmission control solenoids in the transmission 101. The transmission control solenoids control hydraulic pressure during operation of the automatic transmission 101.

Figure 2:
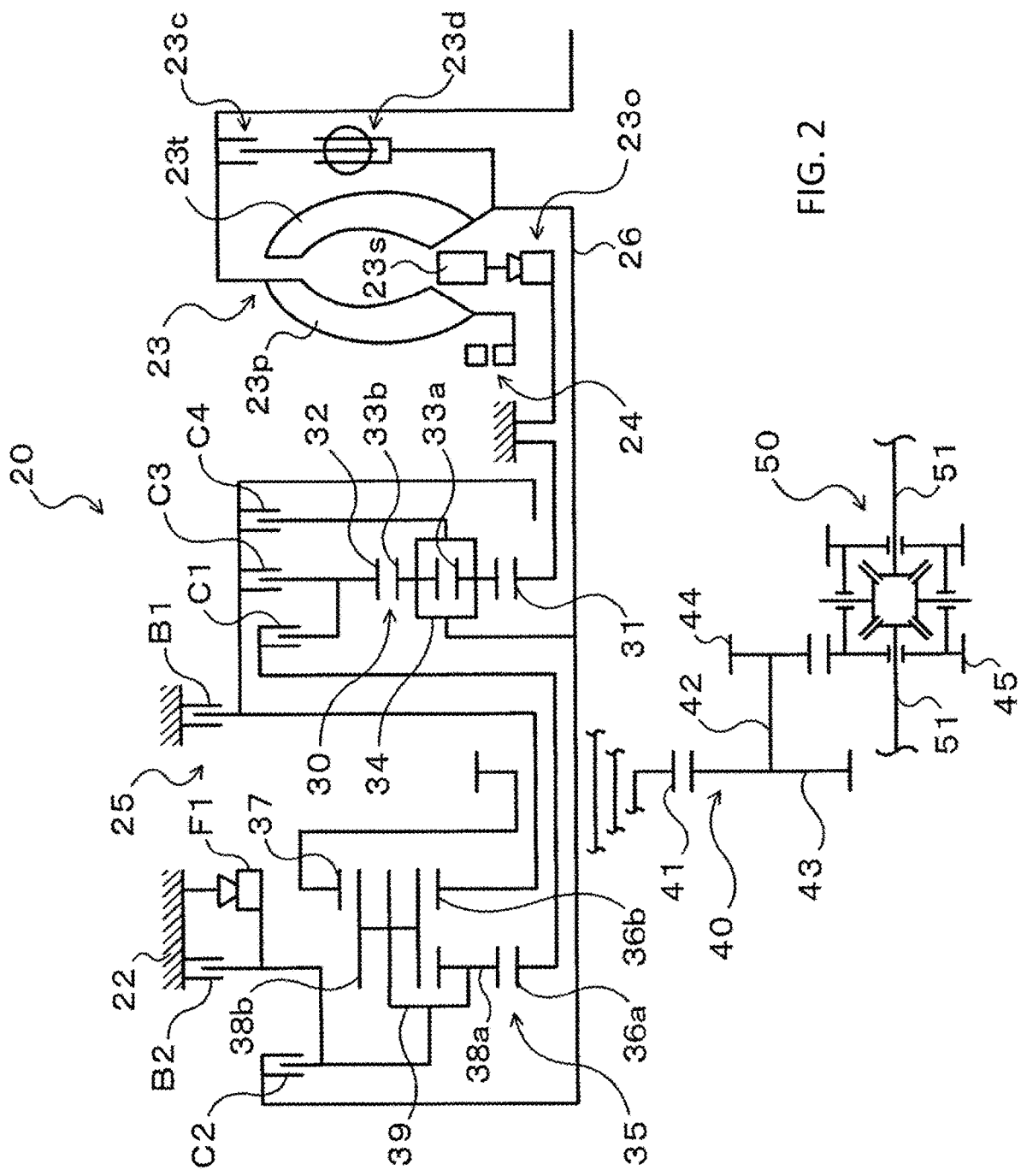
FIG. 2 is a schematic of an example transmission according to an exemplary aspect of the disclosure.

FIG. 2 is a schematic of an exemplary automatic transmission device 101. The automatic transmission device 101 of FIG. 2 is provided as an example. The test stand can be applied to 8-speed transmissions such as UB 80 and UA 80 Toyota transmissions, as well as other automatic transmissions. As shown in FIG. 1, the automatic transmission device 101 includes a transmission case 22, a starting device (fluid transmission device) 23 housed in the transmission case 22, an oil pump 24, gear assembly 25, a gear mechanism (gear train) 40, and a differential gear (differential mechanism) 50.

The starting device 23 included in the automatic transmission device 101 is configured as a torque converter including, for example, an input-side pump impeller 23$p$ connected to the crankshaft of the engine, an output-side turbine runner 23$t$ connected to an input shaft (input member) 26 of the gear assembly 25, a stator 23$s$ disposed inside the pump impeller 23$p$ and the turbine runner 23$t$ to rectify a flow of hydraulic oil from the turbine runner 23$t$ to the pump impeller 23$p$, a one-way clutch 23$o$ restricting a rotation direction of the stator 23$s$ to one direction, a lockup clutch 23$c$, and a damper mechanism 23$d$. The starting device 23 may be configured as a fluid coupling that does not include the stator 23$s$.

The oil pump 24 is configured as a gear pump including, for example, a pump assembly including a pump body and a pump cover, an external gear connected to the pump impeller 23$p$ of the starting device 23 through a hub, and an internal gear meshing with the external gear. The oil pump 24 is driven with power from the engine, intakes hydraulic oil (ATF) stored in an oil pan, and pumps the hydraulic oil to a hydraulic control device that generates a hydraulic pressure required by the starting device 23 and the gear assembly 25.

The gear assembly 25 is configured as an eight-speed transmission. As illustrated in FIG. 1, the gear assembly 25 includes a double pinion type first planetary gear mechanism 30, a Ravigneaux type second planetary gear mechanism 35, four clutches C1, C2, C3, and C4 for changing a power transmission path from an input side to an output side, two brakes B1 and B2, and a one-way clutch F1, as well as the input shaft 26.

The first planetary gear mechanism 30 of the gear assembly 25 includes a sun gear 31 that is an external gear, a ring gear 32 that is an internal gear concentrically disposed with the sun gear 31, and a planetary carrier 34 rotatably (turnably) and revolvably holding a plurality of pairs of two meshing pinion gears 33$a$ and 33$b$ one of which meshes with the sun gear 31 and the other of which is meshes with the ring gear 32. As shown in FIG. 2, the sun gear 31 of the first planetary gear mechanism 30 is held stationary to the transmission case 22, and the planetary carrier 34 of the first planetary gear mechanism 30 is coupled to the input shaft 26 in such a manner that the planetary carrier 34 and the input shaft 26 can rotate as one unit. The first planetary gear mechanism 30 is configured as a so-called reduction gear, reduces the speed of power transmitted to the planetary carrier 34 as an input element, and outputs the power from the ring gear 32 as an output element.

The second planetary gear mechanism 35 of the gear assembly 25 includes a first sun gear 36$a$ and a second sun gear 36$b$ that are external gears, a ring gear 37 that is an internal gear concentrically disposed with the first and second sun gears 36$a$ and 36$b$, a plurality of short pinion gears 38$a$ meshing with the first sun gear 36$a$, a plurality of long pinion gears 38$b$ meshing with the second sun gear 36$b$ and the short pinion gears 38$a$ and meshing with the ring gear 37, and a planetary carrier 39 rotatably (turnably) and revolvably holding the short pinion gears 38a and the long pinion gears 38b. The ring gear 37 of the second planetary gear mechanism 35 functions as an output member of the gear assembly 25, and power transmitted from the input shaft 26 to the ring gear 37 is transmitted to the left and right drive wheels through the gear mechanism 40, the differential gear 50, and the drive shaft 51. The planetary carrier 39 is supported by the transmission case 22 through the one-way clutch F1. The rotation direction of the planetary carrier 39 is restricted to one direction by the one-way clutch F1.

The clutch C1 is a multi-plate friction hydraulic clutch (friction engaging element) that includes a hydraulic servo composed of, for example, a piston, friction plates, separator plates, and an oil chamber to which the hydraulic oil is supplied, and connects and disconnects the ring gear 32 of the first planetary gear mechanism 30 to and from the first sun gear 36a of the second planetary gear mechanism 35. The clutch C2 is a multi-plate friction hydraulic clutch that includes a hydraulic servo composed of, for example, a piston, friction plates, separator plates, and an oil chamber to which the hydraulic oil is supplied, and connects and disconnects the input shaft 26 to and from the planetary carrier 39 of the second planetary gear mechanism 35. The clutch C3 is a multi-plate friction hydraulic clutch that includes a hydraulic servo composed of, for example, a piston, friction plates, separator plates, and an oil chamber to which the hydraulic oil is supplied, and connects and disconnects the ring gear 32 of the first planetary gear mechanism 30 to and from the second sun gear 36b of the second planetary gear mechanism 35. The clutch C4 is a multi-plate friction hydraulic clutch that includes a hydraulic servo composed of, for example, a piston, friction plates, separator plates, and an oil chamber to which the hydraulic oil is supplied, and connects and disconnects the planetary carrier 34 of the first planetary gear mechanism 30 to and from the second sun gear 36b of the second planetary gear mechanism 35.

The brake B1 is a multi-plate friction hydraulic brake that includes a hydraulic servo composed of, for example, friction plates 121 and separator plates 122 as frictional engaging plates and an oil chamber to which the hydraulic oil is supplied, and non-rotatably holds the second sun gear 36b of the second planetary gear mechanism 35 stationary to the transmission case 22 and releases the second sun gear 36b of the second planetary gear mechanism 35 held stationary to the transmission case 22. The brake B2 is a multi-plate friction hydraulic brake that includes a hydraulic servo composed of, for example, friction plates, separator plates, and an oil chamber to which the hydraulic oil is supplied, and non-rotatably holds the planetary carrier 39 of the second planetary gear mechanism 35 stationary to the transmission case 22 and releases the planetary carrier 39 of the second planetary gear mechanism 35 held stationary to the transmission case 22.

The one-way clutch F1 includes, for example, an inner race coupled (fixed) to the planetary carrier 39 of the second planetary gear mechanism 35, an outer race, a plurality of sprags, a plurality of springs (leaf springs), and a cage, transmits torque through the sprags when the outer race rotates in one direction relative to the inner race, and when the outer race rotates in the other direction relative to the inner race, allows relative rotation of the inner race and the outer race. The one-way clutch F1 may have a configuration such as a roller type, except the sprag type.

Evaluating the performance of an automatic transmission typically requires an analysis by a person that is highly experienced in automatic transmission devices. In particular, determining whether an automatic transmission is performing within specifications can be very difficult since a large amount of information has to be interpreted in a short amount of time. Numerous tests may have to be performed, and the tests may not be consistent. A solution of recording sensor signals from, for example, solenoids and torque meters may generate a large amount of data that must be analyzed by an expert in transmission performance. However, even persons that have much experience in evaluating automatic transmissions may take several days or weeks to analyze the data. It is possible to display vast amount of data visually, for example in a two-dimensional graph. However, even two-dimensional graphs that cover the period of the entire test would require extensive analysis to understand if the automatic transmission is performing as expected.

In one embodiment, specific thresholds are used to determine judgement criteria. For example, the time between issuing the solenoid command and reaching a threshold turbine speed in the torque converter 121 may be a judgement criterion for judging performance during gear shifting. The judgement results of the judgement criteria are values that can be used to easily judge the performance of the automatic transmission and the group of components related to the judgement criteria.

Figure 3:
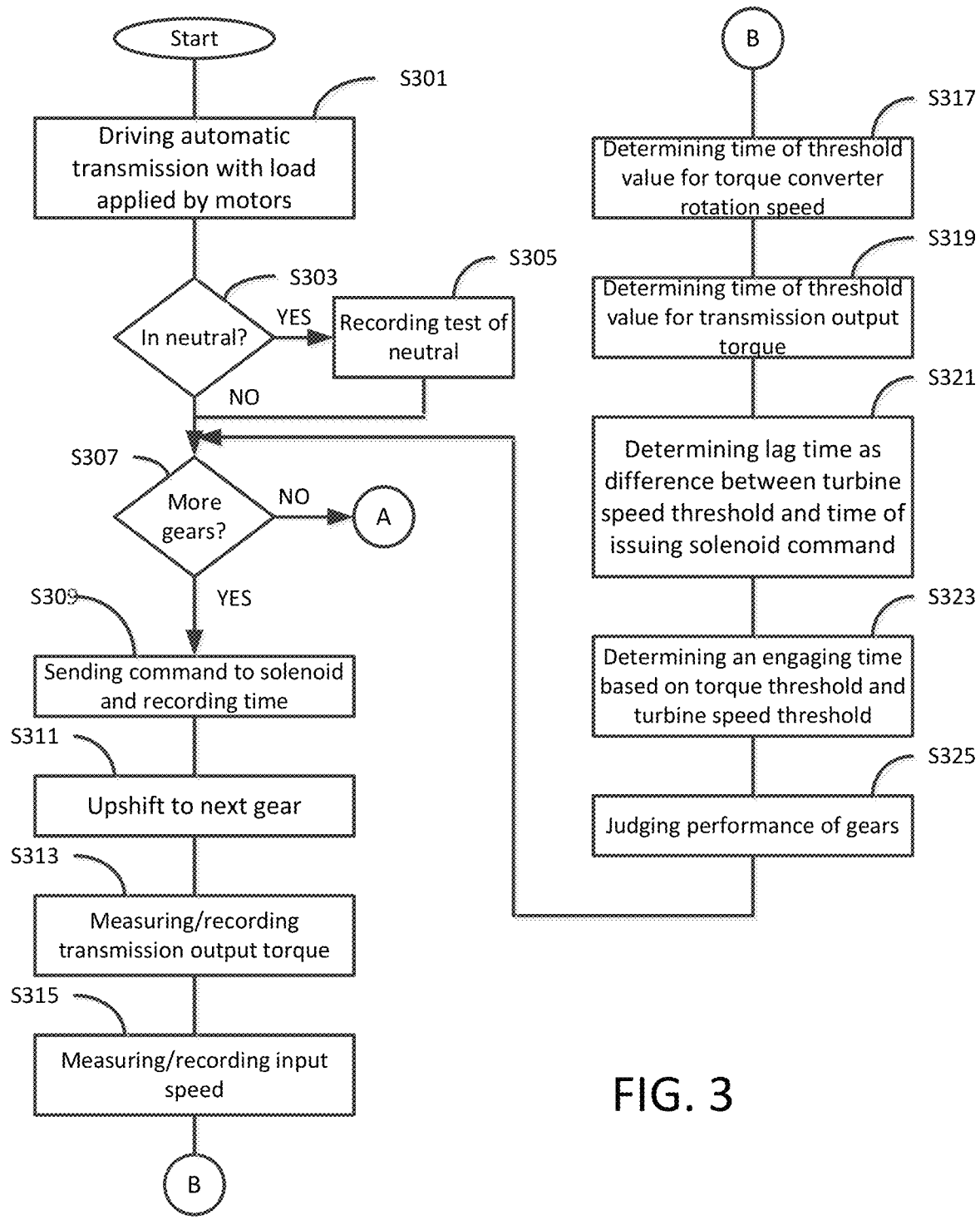
FIG. 3 is a flowchart of a method of evaluating shift performance of an automatic transmission system.

Once the test stand 100 is set up for testing performance of an automatic transmission, the automatic transmission may be driven by the input motor M1 131 with a load applied by output motors M2 133 and M3 135. FIG. 3 is a flowchart of a method for judging performance of an automatic transmission. Although the steps of the flowchart are shown in a particular order, it should be understood that the order of steps is not limited to the order shown. For example, a shift test may be performed by shifting from neutral to drive, then shifting from neutral to reverse, shifting with lockup ON, shifting with lockup OFF, upshifting through all gears then downshifting through all gears. Also, testing with lockup on or lockup off, shifting from neutral to drive, and from neutral to reverse can be performed in any order. In S301, the automatic transmission 101 is driven with load applied. The input speed of the input motor M1 131 may be within the motor operation range without stalling. If the automatic transmission 101 is in neutral (YES in S303), in S305, the output torque is measured while the transmission 101 is in neutral. If the transmission 101 is shifted into a gear, a command is sent to a solenoid in S309 and the time that the command is sent is recorded. In S311, the transmission is upshifted to the next gear. In S313, the transmission output torque is measured and recorded. It is noted that the transmission output torque A is periodically measured and recorded. In S315, the input motor speed D is measured and recorded. In S317, a threshold value is determined for torque converter 121 rotation speed. The motor input speed D is also periodically measured and recorded.

In S319, a threshold value for transmission output torque (N m) is determined. In S321, the time difference between reaching the turbine speed threshold and time of issuing solenoid command is determined as a time lag. In S323, the time difference between reaching the turbine speed threshold and reaching the torque threshold is determined as an engaging time. In S325, the performance of the gears is judged using the time lag, engaging time and a maximum torque. The gears are further shifted, lag time, engaging time, and maximum torque are determined in order to judge shifting between adjacent gears until the last gear is reached (NO, in S307).

Figure 4:
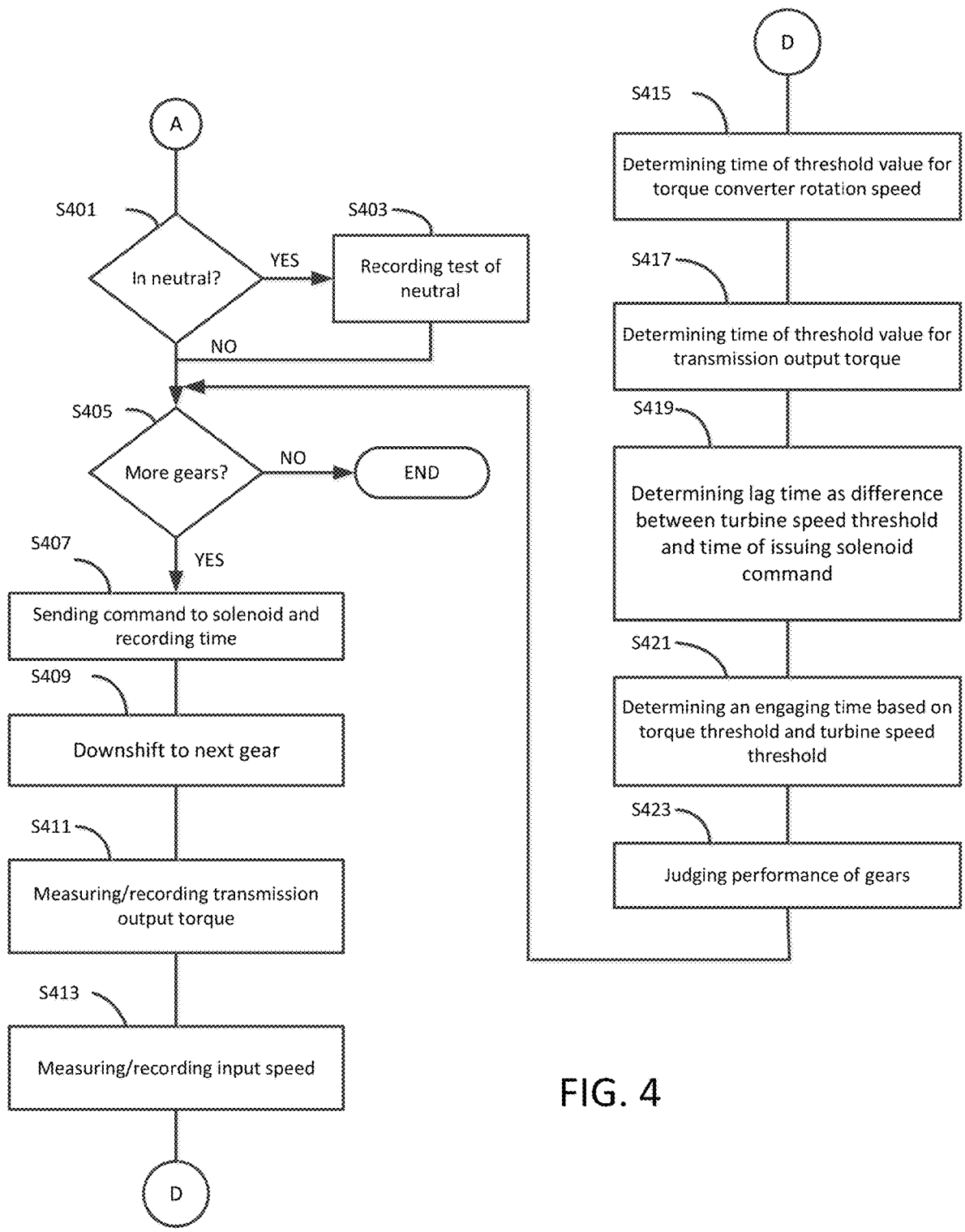
FIG. 4 is a continuation of the flowchart of FIG. 3.

FIG. 4 is a continuation of the flowchart of FIG. 3, for recording measurements while the transmission is in neutral and recording measurements while the transmission is downshifted to lower gears. When the transmission is in neutral (YES, in S401), in S403, the output torque is periodically measured and recorded for operation in neutral. Then the transmission is downshifted. In S407, a command is sent to a solenoid and the time of sending the command is recorded. In S409, the transmission is downshifted to the next lowest gear. In S411, the output torque is periodically measured and recorded. In S413, the input rotational speed is periodically measured and recorded. In S415, the threshold value for torque converter rotation speed is detected. In S417, the threshold value for transmission output torque is detected. In S419, the time difference between the time of issuing the solenoid command and the time that the turbine speed threshold is reached is determined as a lag time. In S421, the time difference between the turbine speed threshold and the time to reach a minimum torque is determined as an engaging time. In S423, the lag time, engaging time, and a minimum torque are used in judging the performance of gears. The gears are further downshifted, lag time, engaging time, and minimum torque are determined in order to judge shifting between adjacent gears until the last gear is reached (NO, in S405).

Figure 5:
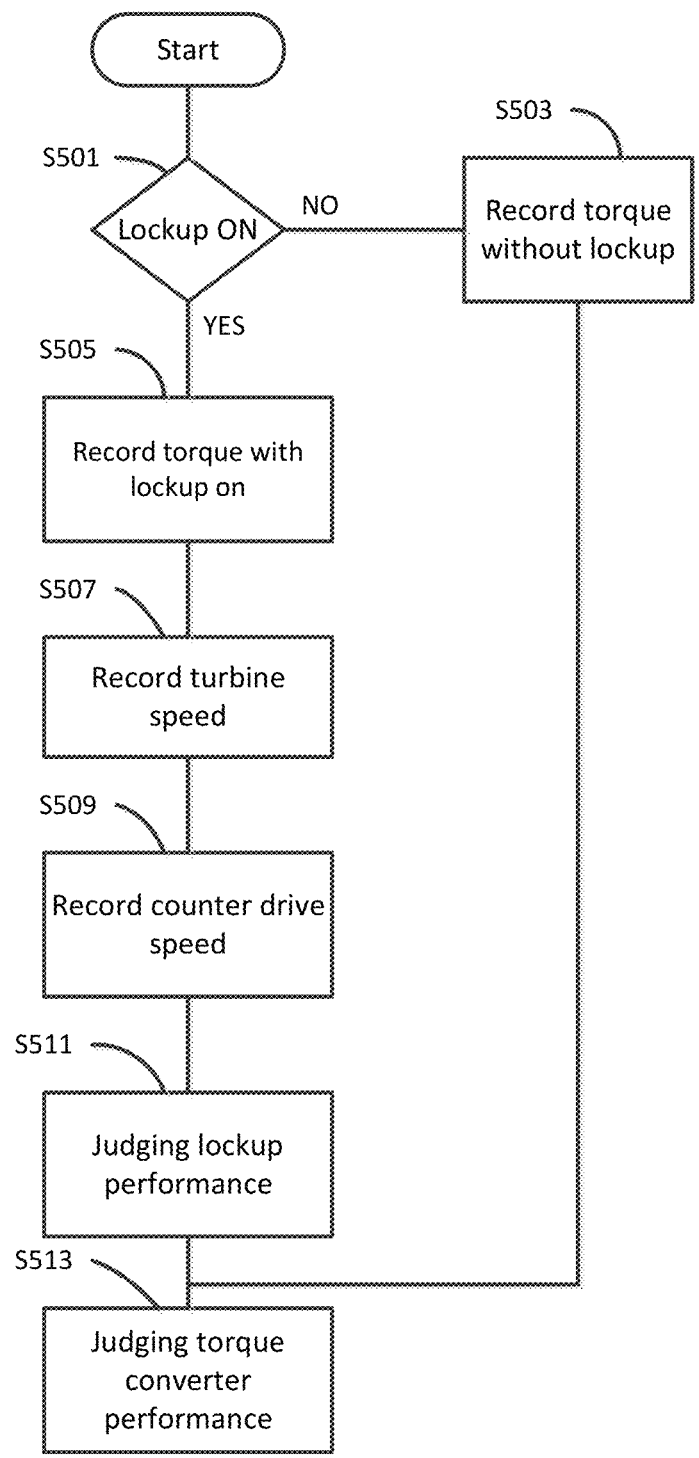
FIG. 5 is a flowchart of a method of testing performance of the torque converter.

FIG. 5 is a flowchart for a method of judging performance of the torque converter 121. The torque converter 121 may include a lockup mechanism. In S501, in the case that lockup is ON (YES, in S501), in S505 the output torque is recorded for lockup ON. Also, turbine speed is recorded in S507 and counter drive speed is recorded in S509. The performance of lockup ON is judged in S511. In the case that lockup is OFF (NO, in S501), the performance of the torque converter is judged in S513.

FIGS. 6 to 13 are example graphs 113 generated by the judgement program and waveform generator 103. A series of shifting tests may be performed, each test relating to a specific group of components of the automatic transmission 101. Along with the graphs, a symbol, such as X—out of specification, O—within specification, may be displayed for each judgment value.

Figure 6:
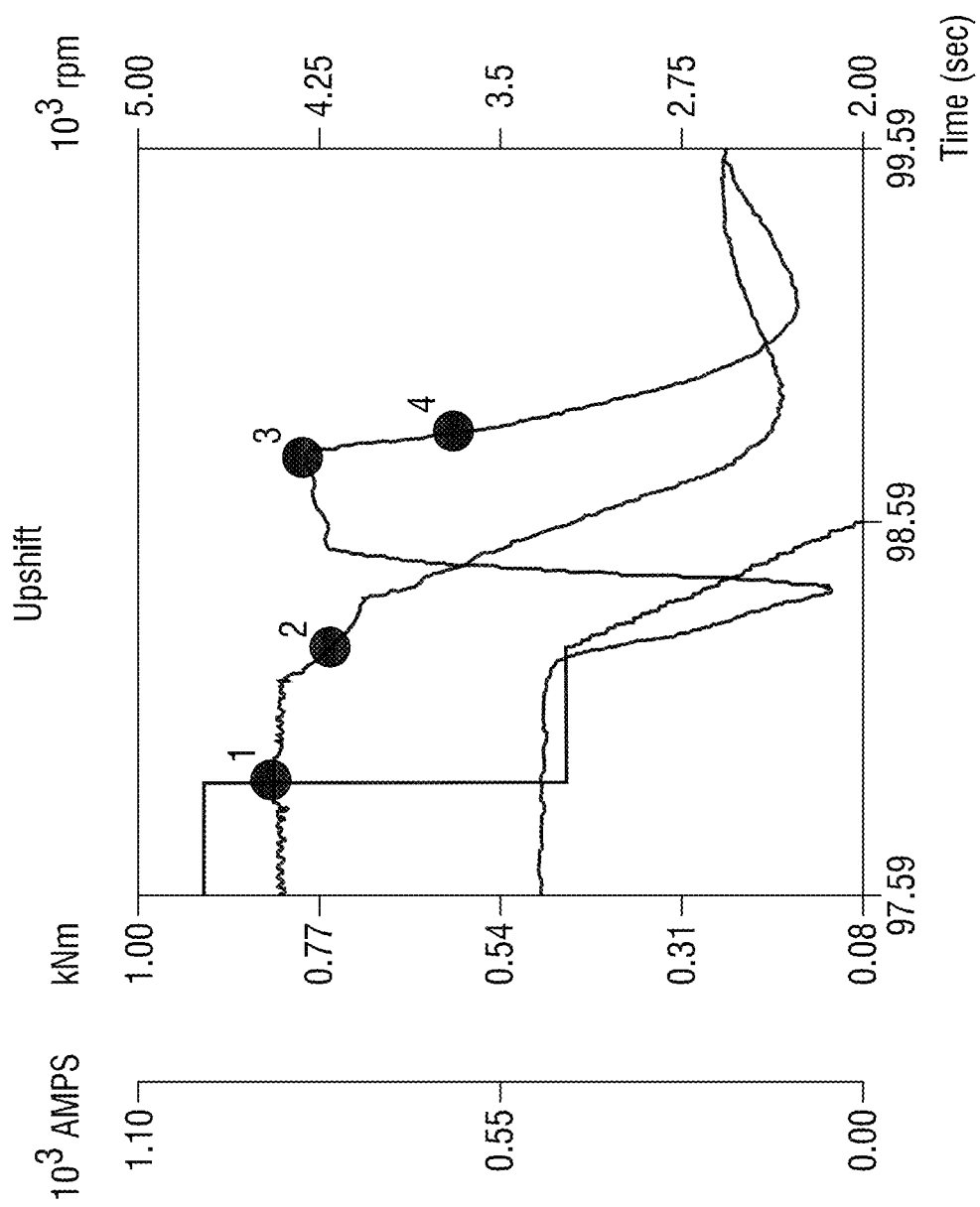
FIG. 6 is a graph of an example performance measurement during upshifting from $1^{st}$ to $8^{th}$ gear.

In one shifting test, the automatic transmission is upshifted from $1^{st}$ to $8^{th}$ gear. In this shifting test, the performance of each gear is evaluated. The upshifting is performed for transitions between each gear and threshold values are detected for each transition. FIG. 6 is a graph for the upshift from $1^{st}$ to $2^{nd}$ gear. The evaluation of the performance of the transition from the $1^{st}$ gear to the $2^{nd}$ gear involves operation of a solenoid for control of fluid pressure. The thresholds that are detected during this shifting test include the point that the solenoid command is first issued, the turbine threshold (NT threshold), the Maximum Torque, and the Left Torque threshold. The judgement conditions include: the time lag (TL) between the turbine threshold point and the point when the solenoid command is first issued (for example 0.9 Amps), a difference (engage time ET) between a left torque threshold and the turbine threshold, and the maximum torque (MaxT).

In an example test, the turbine speed threshold is 4200 rpm and the output torque threshold is 600 N m. Also, the time lag TL for the upshift from $1^{st}$ gear to $2^{nd}$ gear is about 0.33 s, the engage time ET is about 0.57 s, and the maximum torque MaxT is about 810 N m. In this example, the range of acceptable time lag TL range, to meet standards for the transmission, is 0.2 to 0.5 sec. The acceptable engage time ET range is 0.3 to 0.7. The acceptable maximum torque MaxT range is 750 to 950 N m. In this example, each judgment value is within standard and may be displayed with an "O". Similar, judgements are made for the transition between $2^{nd}$ gear and $3^{rd}$ gear, between $3^{rd}$ gear and $4^{th}$ gear, between $4^{th}$ gear and $5^{th}$ gear, between $5^{th}$ gear and $6^{th}$ gear, between $6^{th}$ gear and $7^{th}$ gear, and between $7^{th}$ gear and $8^{th}$ gear, using the same types of thresholds.

In an example shifting test between $2^{nd}$ gear and $3^{rd}$ gear, the turbine speed threshold is 3500 rpm and the output torque threshold is 300 N m. Also, the time lag TL for the upshift from 2nd gear to 3rd gear is about 0.57 s, the engage time ET is about 0.43 s, and the maximum torque MaxT is about 471 N m. In this example, the range of acceptable time lag TL range, to meet standards for the transmission, is 0.3 to 0.7 sec. The acceptable engage time ET range is 0.3 to 0.6. The acceptable maximum torque MaxT range is 425 to 600 N m.

In an example shifting test between 3rd gear and 4th gear, the turbine speed threshold is 3600 rpm and the output torque threshold is 200 N m. Also, the time lag TL for the upshift from 3rd gear to 4th gear is about 0.59 s, the engage time ET is about 0.66 s, and the maximum torque MaxT is about 242 N m. In this example, the range of acceptable time lag TL range, to meet standards for the transmission, is 0.4 to 0.7 sec. The acceptable engage time ET range is 0.5 to 0.9. The acceptable maximum torque MaxT range is 225 to 300 N m.

In an example shifting test between 4th gear and 5th gear, the turbine speed threshold is 3600 rpm and the output torque threshold is 200 N m. Also, the time lag TL for the upshift from 4th gear to 5th gear is about 0.50 s, the engage time ET is about 0.25 s, and the maximum torque MaxT is about 266 N m. In this example, the range of acceptable time lag TL range, to meet standards for the transmission, is 0.4 to 0.6 sec. The acceptable engage time ET range is 0.2 to 0.5. The acceptable maximum torque MaxT range is 250 to 350 N m.

In an example shifting test between 5th gear and 6th gear, the turbine speed threshold is 3800 rpm and the output torque threshold is 125 N m. Also, the time lag TL for the upshift from 5th gear to 6th gear is about 0.75 s, the engage time ET is about 0.46 s, and the maximum torque MaxT is about 171 N m. In this example, the range of acceptable time lag TL range, to meet standards for the transmission, is 0.6 to 0.95 sec. The acceptable engage time ET range is 0.3 to 0.6. The acceptable maximum torque MaxT range is 150 to 300 N m.

In an example shifting test between 6th gear and 7th gear, the turbine speed threshold is 3600 rpm and the output torque threshold is 110 N m. Also, the time lag TL for the upshift from 6th gear to 7th gear is about 0.50 s, the engage time ET is about 0.40 s, and the maximum torque MaxT is about 266 N m. In this example, the range of acceptable time lag TL range, to meet standards for the transmission, is 0.3 to 0.6 sec. The acceptable engage time ET range is 0.2 to 0.5. The acceptable maximum torque MaxT range is 200 to 350 N m.

In an example shifting test between $7^{th}$ gear and $8^{th}$ gear, the turbine speed threshold is 3300 rpm and the output torque threshold is 90 N m. Also, the time lag TL for the upshift from 7th gear to 8th gear is about 0.34 s, the engage time ET is about 0.27 s, and the maximum torque MaxT is about 150 N m. In this example, the range of acceptable time lag TL range, to meet standards for the transmission, is 0.3 to 0.5 sec. The acceptable engage time ET range is 0.18 to 0.3. The acceptable maximum torque MaxT range is 125 to 200 N m.

Figure 7:
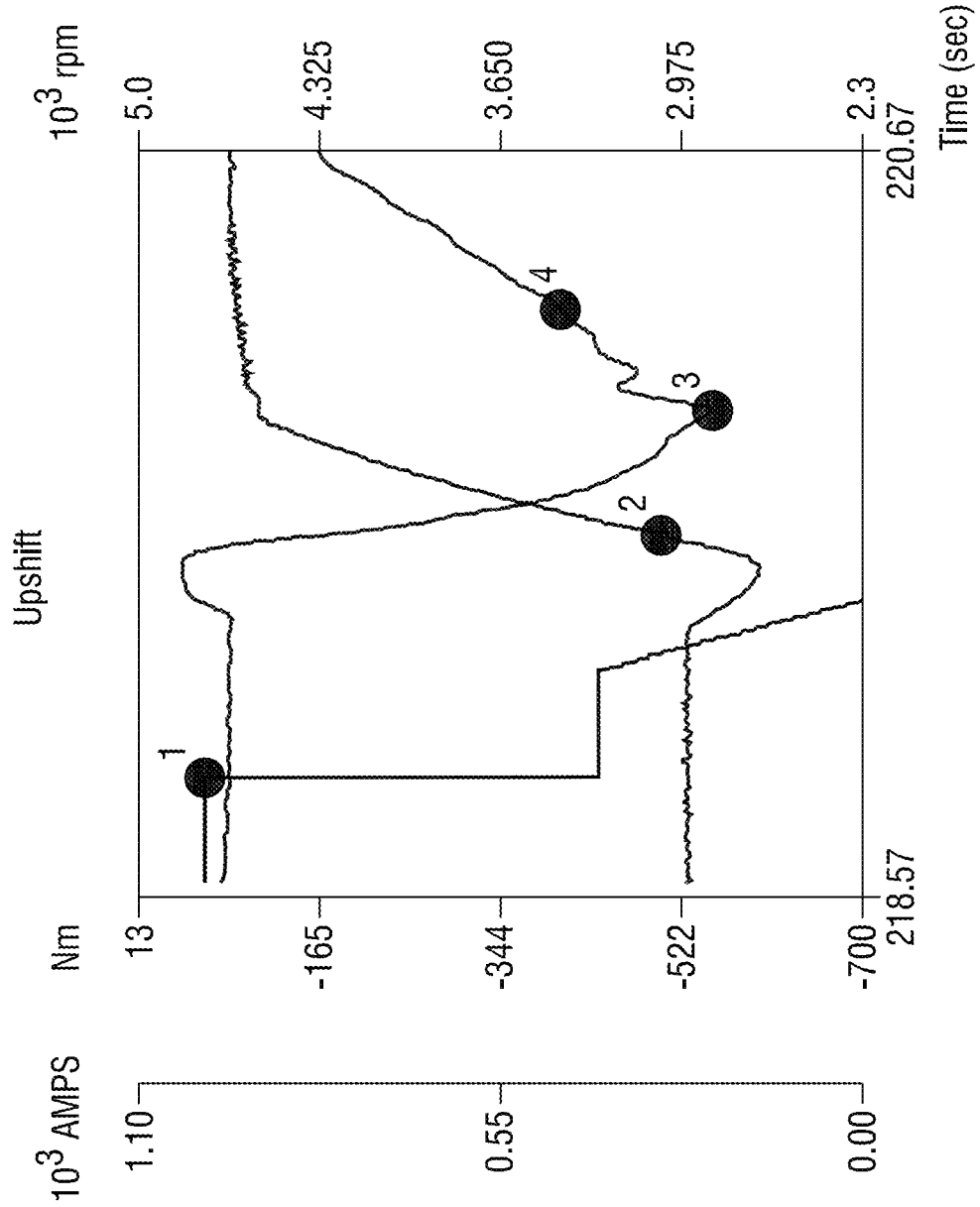
FIG. 7 is a graph of an example performance measurement during downshifting from $8^{th}$ to $1^{st}$ gear.

In another shifting test, the automatic transmission is downshifted from $8^{th}$ to $1^{st}$ gear. In this downshifting test, the performance of each gear is again evaluated. The downshifting is performed for transitions between each gear and threshold values are obtained for each transition. FIG. 7 is a graph for the downshift from $3^{rd}$ gear to $2^{nd}$ gear. Similar to the upshifting test, the evaluation of the performance of the transition from the $3^{rd}$ gear to the $2^{nd}$ gear involves operation of a solenoid for control of fluid pressure. The parameters that are measured during this shifting test include the point that the solenoid command is first issued, the time when the turbine threshold (NT threshold) is reached, the Minimum Torque, and the time when the output Torque threshold is reached. The judgement conditions include: the time lag (TL) between the turbine threshold point and the point when the solenoid command is first issued (0.9 Amps), a difference (engage time ET) between a time of reaching the output torque threshold and reaching the turbine threshold, and the minimum torque (MinT).

In an example test, the turbine speed threshold is 3050 rpm and the output torque threshold is −400 N m. The time lag TL for the downshift from $3^{rd}$ gear to $2^{nd}$ gear is about 0.58 s, the engage time is about 0.67 s, and the minimum torque MinT is about −567 N m. In this example, the range of acceptable time lag TL range, to meet standards for the transmission, is 0.4 to 0.8 sec. The acceptable engage time ET range is 0.6 to 0.8. The acceptable minimum torque MinT range is −650 to −500 N m.

In an example shifting test for $8^{th}$ to $7^{th}$ gear, the turbine speed threshold is 2900 rpm and the output torque threshold is −70 N m. The time lag TL for the downshift from 8th gear to 7th gear is about 0.53 s, the engage time is about 0.33 s, and the minimum torque MinT is about −95 N m. In this example, the range of acceptable time lag TL range, to meet standards for the transmission, is 0.3 to 0.8 sec. The acceptable engage time ET range is 0.1 to 0.35. The acceptable minimum torque MinT range is −150 to −75 N m.

In an example shifting test for $7^{th}$ to $6^{th}$ gear, the turbine speed threshold is 3300 rpm and the output torque threshold is −90 N m. The time lag TL for the downshift from 7th gear to 6th gear is about 0.97 s, the engage time is about 0.55 s, and the minimum torque MinT is about −128 N m. In this example, the range of acceptable time lag TL range, to meet standards for the transmission, is 0.8 to 1.5 sec. The acceptable engage time ET range is 0.3 to 0.6. The acceptable minimum torque MinT range is −150 to −100 N m.

In an example shifting test for $6^{th}$ to $5^{th}$ gear, the turbine speed threshold is 3700 rpm and the output torque threshold is −170 N m. The time lag TL for the downshift from 6th gear to 5th gear is about 0.65 s, the engage time is about 0.18 s, and the minimum torque MinT is about −232 N m. In this example, the range of acceptable time lag TL range, to meet standards for the transmission, is 0.5 to 0.9 sec. The acceptable engage time ET range is 0.05 to 0.6. The acceptable minimum torque MinT range is −400 to −200 N m.

In an example shifting test for $5^{th}$ to $4^{th}$ gear, the turbine speed threshold is 3500 rpm and the output torque threshold is −130 N m. The time lag TL for the downshift from 5th gear to 4th gear is about 0.96 s, the engage time is about 0.46 s, and the minimum torque MinT is about −193 N m. In this example, the range of acceptable time lag TL range, to meet standards for the transmission, is 0.8 to 1.1 sec. The acceptable engage time ET range is 0.3 to 0.6. The acceptable minimum torque MinT range is −250 to −150 N m.

In an example shifting test for $4^{th}$ to $3^{rd}$ gear, the turbine speed threshold is 3350 rpm and the output torque threshold is −225 N m. The time lag TL for the downshift from 4th gear to 3rd gear is about 0.63 s, the engage time is about 0.47 s, and the minimum torque MinT is about −318 N m. In this example, the range of acceptable time lag TL range, to meet standards for the transmission, is 0.5 to 0.9 sec. The acceptable engage time ET range is 0.3 to 0.5. The acceptable minimum torque MinT range is −400 to −200 N m.

In an example shifting test for $2^{nd}$ to $1^{st}$ gear, the turbine speed threshold is 2500 rpm and the output torque threshold is −750 N m. The time lag TL for the downshift from 2nd gear to 1st gear is about 0.90 s, the engage time is about 0.77 s, and the minimum torque MinT is about −908 N m. In this example, the range of acceptable time lag TL range, to meet standards for the transmission, is 0.8 to 1.1 sec. The acceptable engage time ET range is 0.5 to 1.1. The acceptable minimum torque MinT range is −1400 to −800 N m.

Figure 8:
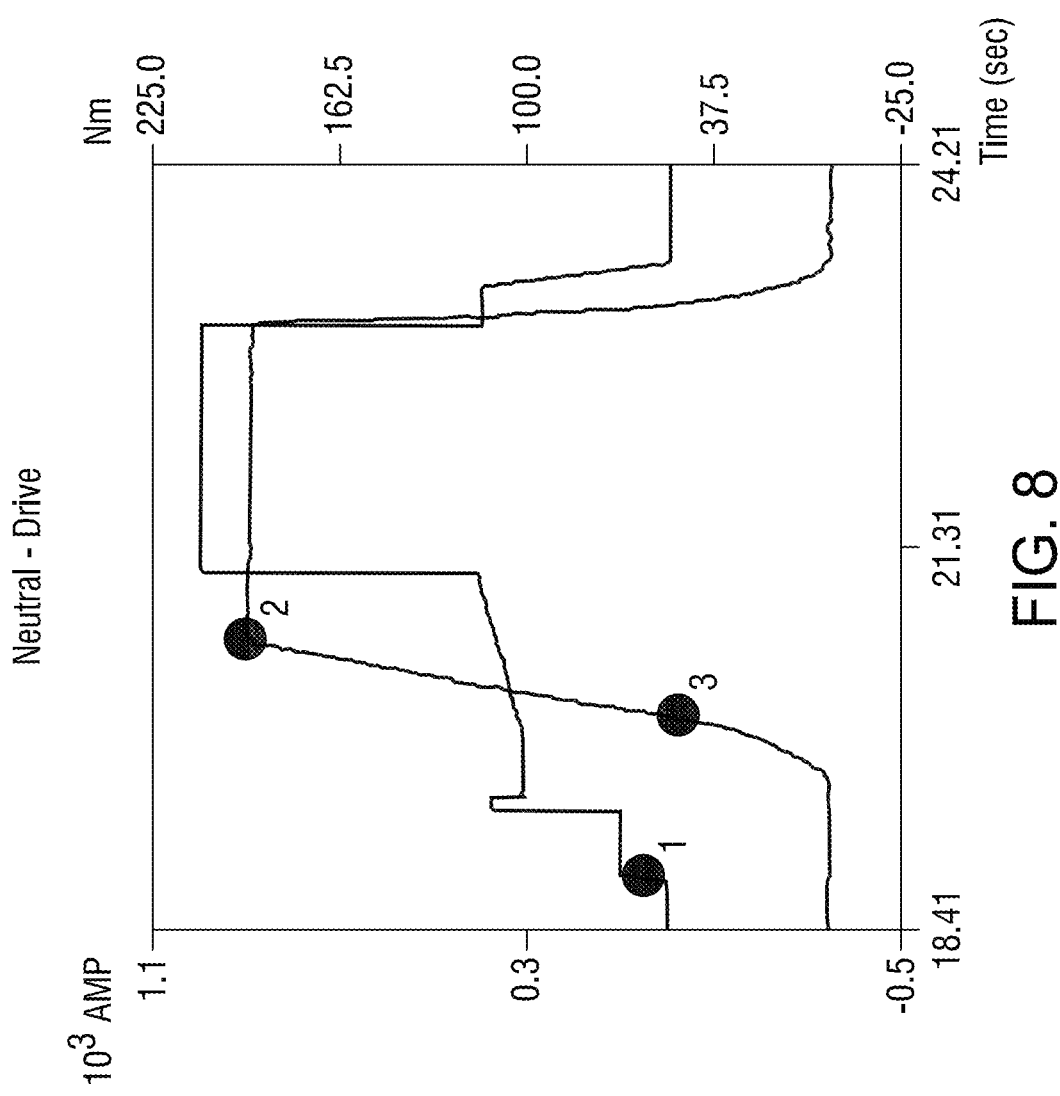
FIG. 8 is a graph of an example performance measurement during shifting from neutral to drive.

In another shifting test, the automatic transmission is shifted from neutral to drive. FIG. 8 is a graph for the shifting from neutral to drive. This test evaluates the performance of the automatic transmission during the transition from no components engaged to engagement into Drive. The thresholds that are measured during this shifting test include the point that the solenoid command is first issued (0.02 Amps), the Maximum Torque, and the Left Torque threshold. The judgement conditions include: the time lag (TL) between the Left Torque threshold point and the point when the solenoid command is first issued, a difference (engage time ET) between a maximum torque and the left threshold, and the maximum torque (MaxT).

In an example test, the output torque threshold is 60 Nm, the time lag TL for the shift from neutral to Drive is about 0.9 s, the engage time is about 0.24 s, and the maximum torque MaxT is about 206 N m. The acceptable range for time lag TL is 0.7 to 1.25 sec. The acceptable range for engage time ET is 0 to 0.5 sec. The acceptable range for maximum torque is 190 to 300 N m.

Figure 9:
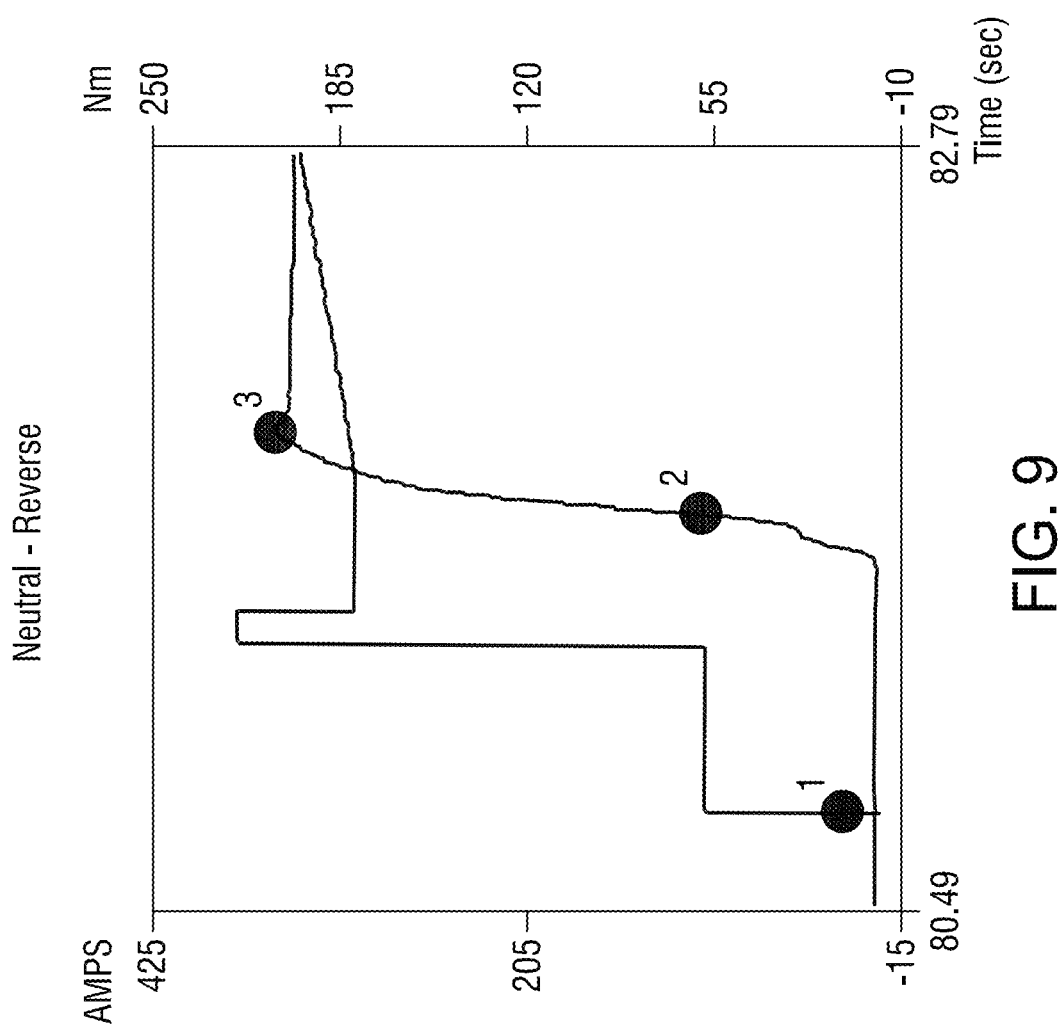
FIG. 9 is a graph of an example performance measurement during shifting from neutral to reverse.

In another shifting test, the automatic transmission is shifted from neutral to reverse. FIG. 9 is a graph for the shifting from neutral to reverse. This test evaluates the performance of the automatic transmission during the transition from no components engaged to engagement of the. The thresholds that are measured during this shifting test include the point that the solenoid command is first issued, the Maximum Torque, and the Left Torque threshold. The judgement conditions that are calculated using the measured thresholds include: the time lag (TL) between the Left Torque threshold point and the point when the solenoid command is first issued (0.05 Amps), a difference (engage time ET) between a maximum torque and the left threshold, and the maximum torque (MaxT).

In an example test, the output torque threshold is 50 N m, the time lag TL for the shift from neutral to reverse is about 083 s, the engage time is about 0.54 s, and the maximum torque MaxT is about 188.73 N m. An acceptable range for time lag TL for this test is 0.75 to 1.25 sec. An acceptable range for engage time is 0.3 to 0.8 sec. An acceptable range for max torque in this test is 125 to 225 N m.

Figure 10:
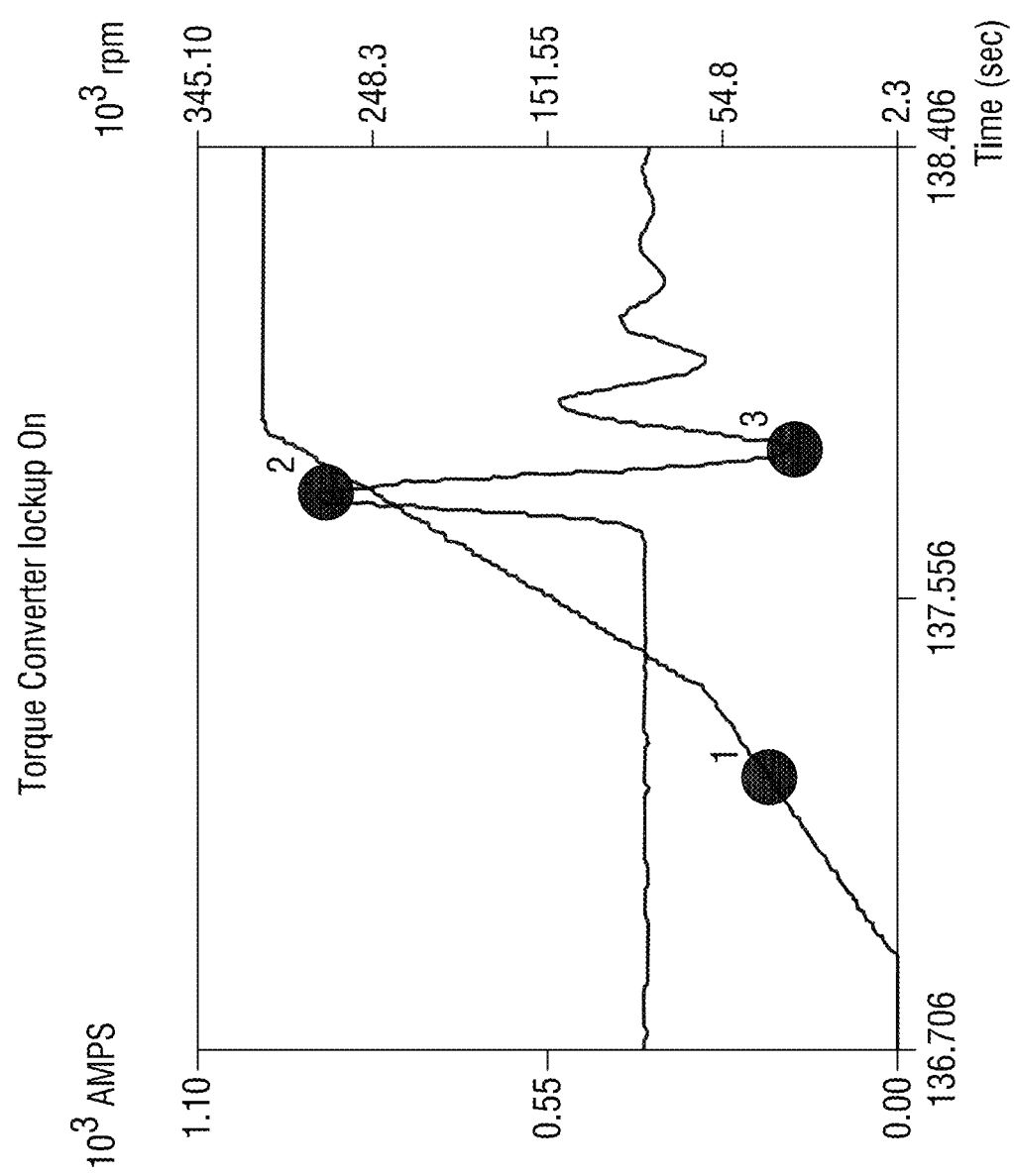
Figure 11:
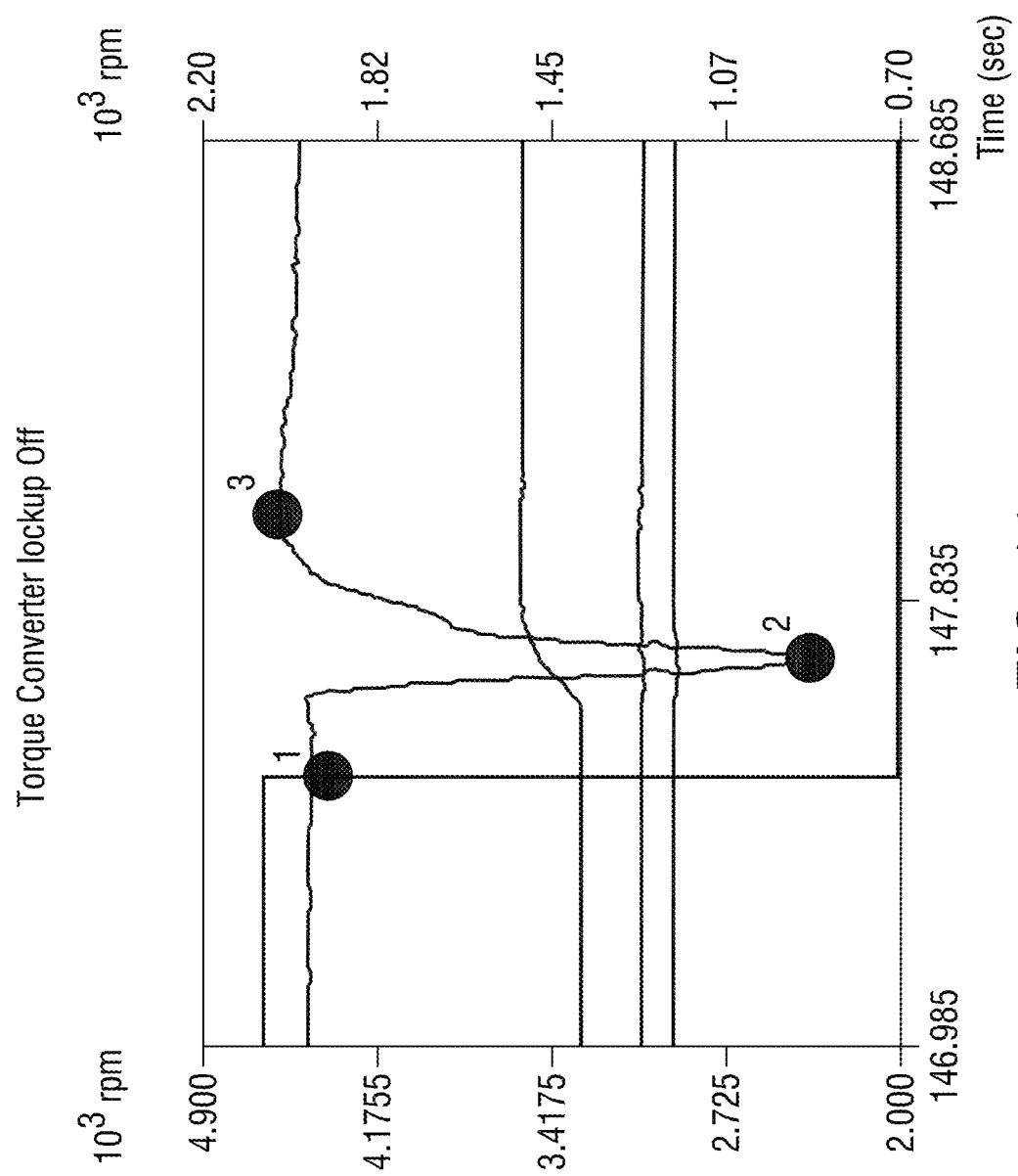
FIG. 11 is a graph of an example performance measurement of a torque converter with lockup off.

In one embodiment, the automatic transmission includes a torque converter that has a lockup mechanism, such as a lockup clutch. The lockup mechanism binds the engine to the transmission when their speeds are nearly equal. A shifting test can be made to test the performance of the torque converter lockup mechanism. The shifting test for the lockup mechanism can include operating the automatic transmission including engaging the lockup mechanism and without engaging the lockup mechanism. FIG. 10 is an example graph for a shifting test with lockup on. FIG. 11 is an example graph for a shifting test with lockup off. The thresholds that are measured during each case of lockup on or lockup off include the point that a solenoid command is issued (0.2 Amps, 0.9 Amps, respectively), the minimum torque and the maximum torque as measured by the torque meter 105. The judgement conditions that are calculated using the measured thresholds include a time lag between the time that minimum torque is reached and the point when the solenoid command is issued, the minimum torque and the maximum torque.

In an example shifting test with lockup on, the solenoid command was issued at 0.55 sec, the minimum torque was 12 N m, and the maximum torque was 275 N m. Acceptable ranges for this test are 0.2 to 1.2 sec, 15 to −25 N m, and 175 to 350 N m, respectively. In an example shifting test with lockup off, the solenoid command was issued at 0.52 sec, the minimum torque was −6 N m, and the maximum torque was 104 N m. Acceptable ranges for this test are 0.2 to 1.2 sec, −5 to −25 N m, and 75 to 200 N m, respectively.

Figure 12:
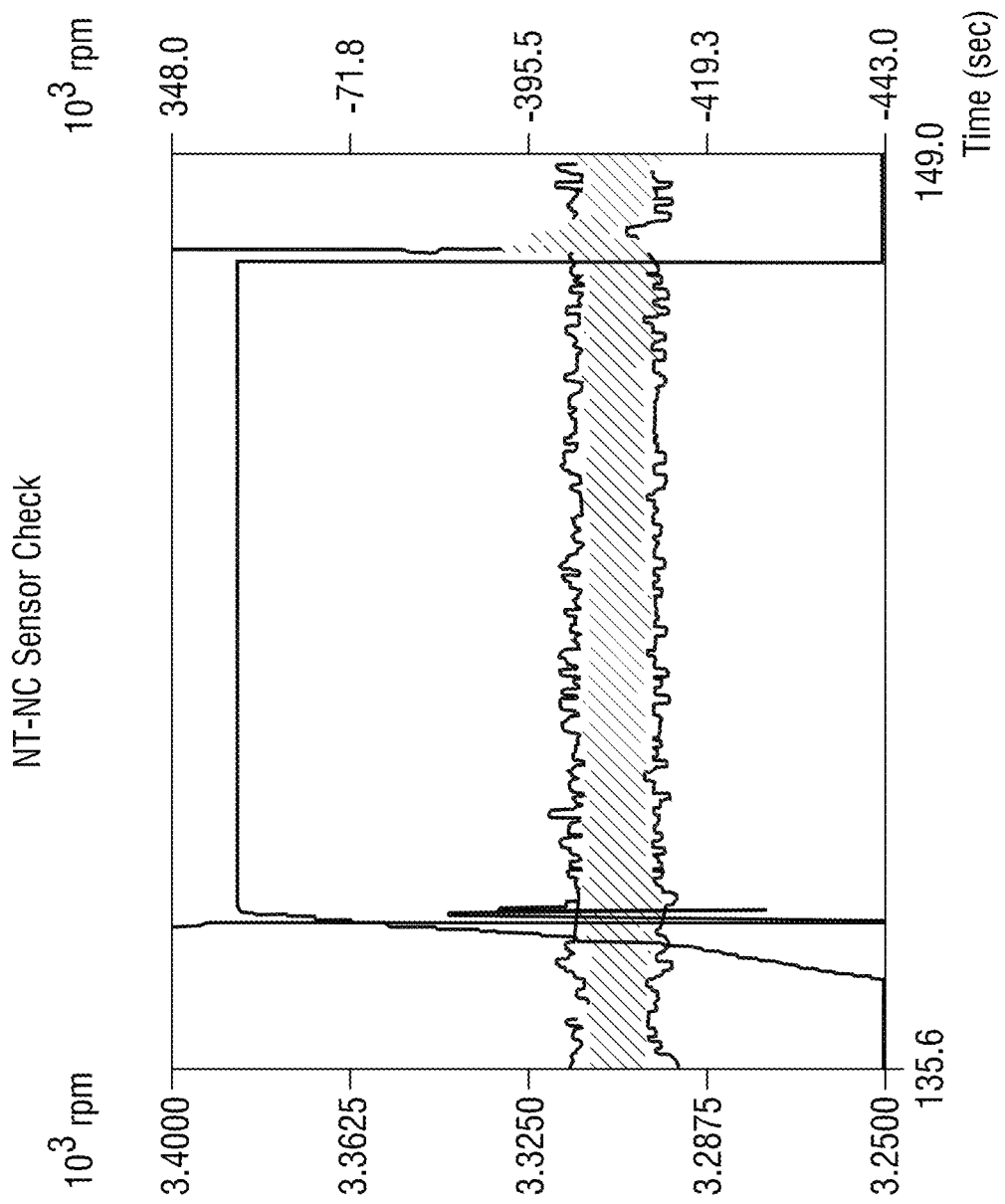
FIG. 12 is a graph of an example performance measurement for difference in reading of a turbine sensor and a counter drive sensor.

In one embodiment, the test stand 100 includes a turbine speed sensor and a counter drive speed sensor. Readings from the turbine speed sensor (NT) and the counter speed sensor (NC) may be read in order to judge the performance of these sensors. FIG. 12 is an example graph showing results of a test to check the performance of the turbine speed sensor and the counter speed sensor. This test (NT-NC) is done when the transmission is in a gear where the NT (turbine) sensor should be rotating at the same speed as the NC (counter drive). Using the reading from NT sensor and subtracting the reading from NC sensor should be a very small difference thus confirming that the sensors are reading correctly. An acceptable range of differences in rpm is −5 to 5 rpm.

Figure 13:
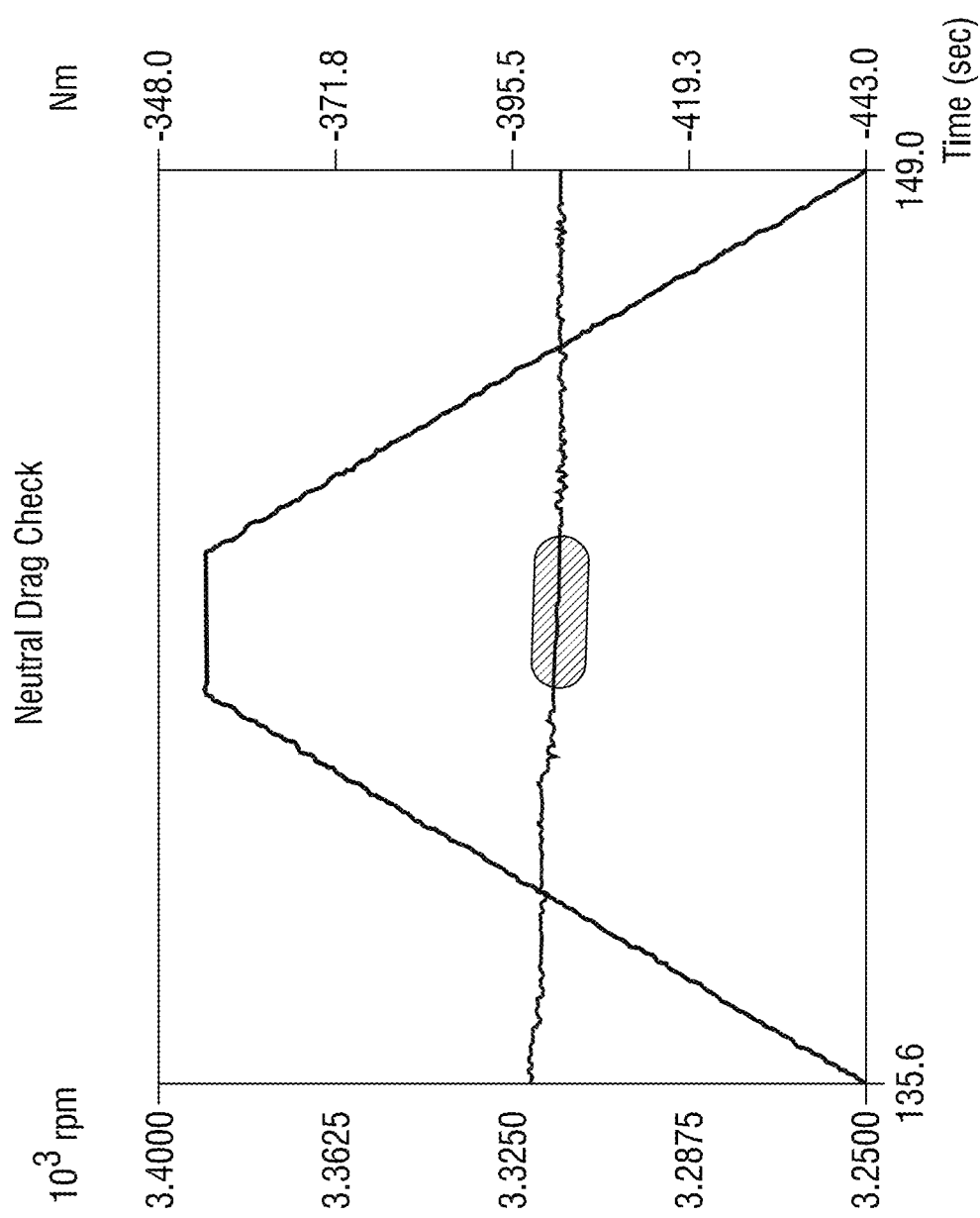
FIG. 13 is a graph of an example performance measurement for neutral drag.

FIG. 13 is an example graph showing results of a test to check the performance of the automatic transmission in neutral. This check is done with the transmission in neutral and the purpose is to check the assembled condition of clutches/brakes as well as bushings and bearings. This is done by measuring the torque while in neutral as the transmission is run with no components engaged. An acceptable drag range is −8 to 8 N m. This test confirms the amount of drag from the internal parts.

Figure 14:
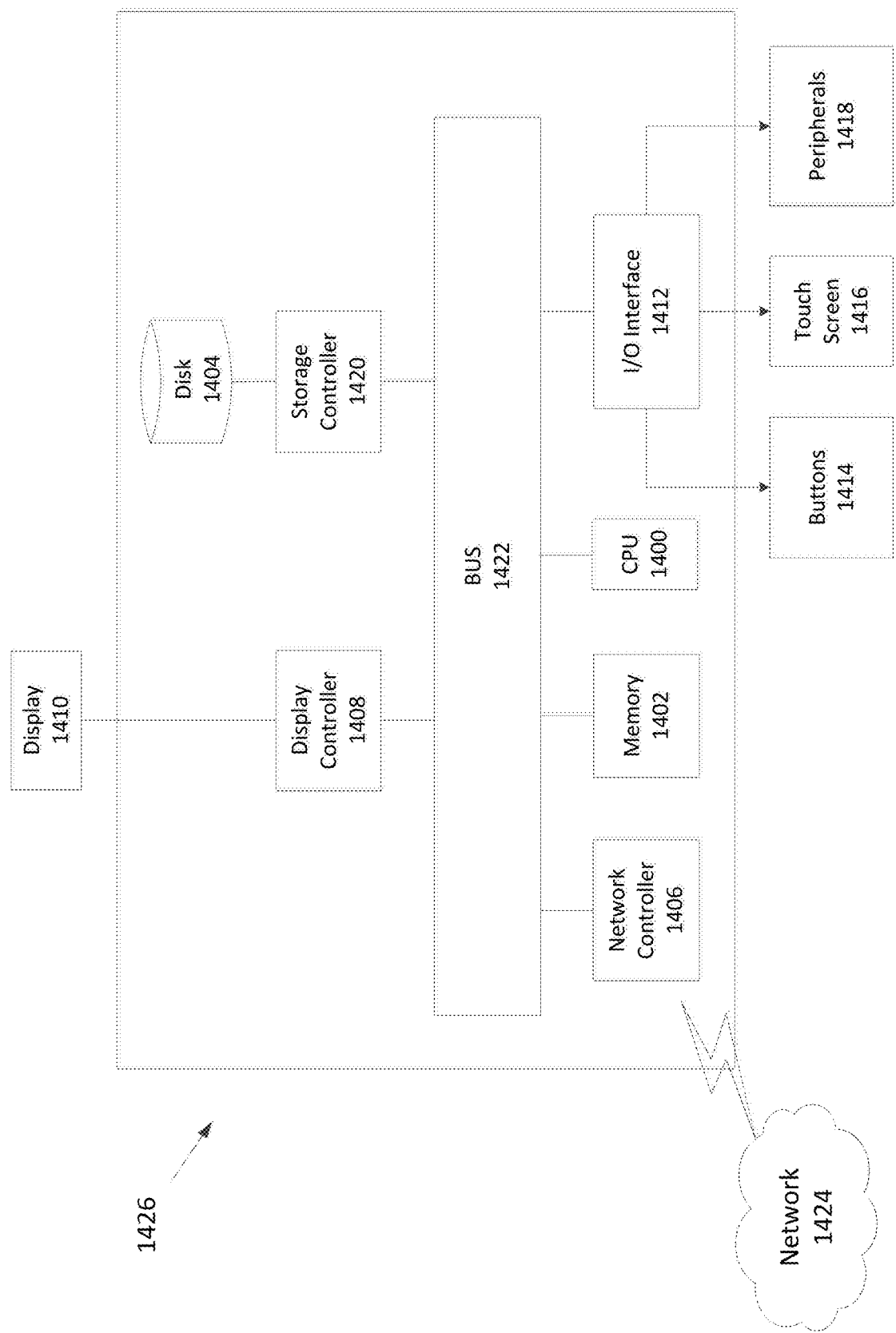
FIG. 14 is a block diagram for a desktop or a laptop computer that may be used to perform the shift performance evaluation according to an exemplary aspect of the computer.

In one implementation, the functions and processes of the automatic measuring system 111 may be implemented by a computer 1426. Next, a hardware description of the computer 926 according to exemplary embodiments is described with reference to FIG. 14. In FIG. 14, the computer 1426 includes a CPU 1400 which performs the processes described herein. The process data and instructions may be stored in memory 1402. These processes and instructions may also be stored on a storage medium disk 1404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1426 communicates, such as a server or computer.

Further, the claimed advancements may be provided as a utility application, background daemon, or component of an operating system, or combination thereof, executing in conjunction with CPU 1400 and an operating system such as Microsoft® Windows®, UNIX®, Oracle® Solaris, LINUX®, Apple macOS® and other systems known to those skilled in the art.

In order to achieve the computer 1426, the hardware elements may be realized by various circuitry elements, known to those skilled in the art. For example, CPU 1400 may be a Xenon® or Core® processor from Intel Corporation of America or an Opteron® processor from AMD of America, or may be other processor types that would be recognized by one of ordinary skill in the art. Alternatively, the CPU 1400 may be implemented on an FPGA, ASIC, PLD or using discrete logic circuits, as one of ordinary skill in the art would recognize. Further, CPU 1400 may be implemented as multiple processors cooperatively working in parallel to perform the instructions of the inventive processes described above.

The computer 1426 in FIG. 14 also includes a network controller 1406, such as an Intel Ethernet PRO network interface card from Intel Corporation of America, for interfacing with network 1424. As can be appreciated, the network 1424 can be a public network, such as the Internet, or a private network such as LAN or WAN network, or any combination thereof and can also include PSTN or ISDN sub-networks. The network 1424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1426 further includes a display controller 1408, such as a NVIDIA® GeForce® GTX or Quadro® graphics adaptor from NVIDIA Corporation of America for interfacing with display 1410, such as a Hewlett Packard® HPL2445w LCD monitor. A general purpose I/O interface 1412 interfaces with a keyboard and/or mouse 1414 as well as an optional touch screen panel 1416 on or separate from display 1410. General purpose I/O interface also connects to a variety of peripherals 1418 including printers and scanners, such as an OfficeJet® or DeskJet® from Hewlett Packard®.

The general purpose storage controller 1420 connects the storage medium disk 1404 with communication bus 1422, which may be an ISA, EISA, VESA, PCI, or similar, for interconnecting all of the components of the computer 1426. A description of the general features and functionality of the display 1410, keyboard and/or mouse 1414, as well as the display controller 1408, storage controller 1420, network controller 1406, and general purpose I/O interface 1412 is omitted herein for brevity as these features are known.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method, performed by a test control system, of evaluating shift performance of an automatic transmission system having gears, and a torque converter, the method comprising:
    driving the automatic transmission with an input motor at an input speed while applying a rotational load by a pair of output motors;

applying a command to a solenoid to change fluid pressure and detecting a time when the solenoid command is sent to the solenoid;
shifting between a pair of the gears;
measuring transmission output torque and obtaining torque values;
determining a threshold value for a torque converter rotation speed;
determining a threshold value for the transmission output torque;
determining a lag time between a threshold for a turbine speed and the detected time for the solenoid;
determining an engage time based on the torque threshold value and the turbine speed threshold; and
judging the performance of the pair of gears based on the lag time, engage time and a peak of the transmission output torque.

2. The method of claim 1, wherein the shifting between the pair of gears includes an upshifting between gears and a downshifting between the gears.

3. The method of claim 2, wherein the shifting between gears includes a shifting between each pair of adjacent gears in the automatic transmission system.

4. The method of claim 1, further comprising shifting from neutral to drive and shifting from neutral to reverse, and
judging the performance of the automatic transmission in neutral based on the time lag, engage time and a peak of the transmission output torque during the shifting from neutral.

5. The method of claim 1, further comprising measuring transmission output torque and obtaining torque values with a torque converter lockup enabled and with a torque converter lockup off, and
judging the performance of the automatic transmission based on a time lag to reach minimum output torque from when the solenoid command is first issued.

6. The method of claim 1, further comprising measuring torque while the transmission remains in neutral in order to judge the condition of clutches, brakes, bushings, and bearings.

7. The method of claim 1, wherein the torque converter includes a turbine and a counter drive,
wherein the determining a threshold value for the torque converter rotation speed includes detecting a turbine rotating speed and a counter drive rotating speed, and judging a condition of the torque converter based on the difference between the turbine rotating speed and the counter drive rotating speed.

8. A non-transitory computer-readable storage medium storing instructions, which when executed by a computer in a test control system perform a method of evaluating shift performance of an automatic transmission system having gears, and a torque converter, the method comprising:
driving the automatic transmission with an input motor at an input speed while applying a rotational load by a pair of output motors;
applying a command to a solenoid to change fluid pressure and detecting a time when the solenoid command is sent to the solenoid;
shifting between a pair of the gears;
measuring transmission output torque and obtaining torque values;
determining a threshold value for a torque converter rotation speed;
determining a threshold value for the transmission output torque;
determining a lag time between a threshold for a turbine speed and the detected time for the solenoid;
determining an engage time based on the torque threshold value and the turbine speed threshold; and
judging the performance of the pair of gears based on the lag time, engage time and a peak of the transmission output torque.

9. The non-transitory computer-readable storage medium of claim 8, wherein the shifting between the pair of gears includes an upshifting between gears and a downshifting between the gears.

10. The non-transitory computer-readable storage medium of claim 9, wherein the shifting between gears includes a shifting between each pair of adjacent gears in the automatic transmission system.

11. The non-transitory computer-readable storage medium of claim 8, further comprising shifting from neutral to drive and shifting from neutral to reverse, and
judging the performance of the automatic transmission in neutral based on the time lag, engage time and a peak of the transmission output torque during the shifting from neutral.

12. The non-transitory computer-readable storage medium of claim 8, further comprising measuring transmission output torque and obtaining torque values with a torque converter lockup enabled and with a torque converter lockup off, and
judging the performance of the automatic transmission based on a time lag to reach minimum output torque from when the solenoid command is first issued.

13. The non-transitory computer-readable storage medium of claim 8, further comprising measuring torque while the transmission remains in neutral in order to judge the condition of clutches, brakes, bushings, and bearings.

14. The non-transitory computer-readable storage medium of claim 8, wherein the torque converter includes a turbine and a counter drive,
wherein the determining a threshold value for the torque converter rotation speed includes detecting a turbine rotating speed and a counter drive rotating speed, and judging a condition of the torque converter based on the difference between the turbine rotating speed and the counter drive rotating speed.

15. A test control system that evaluates shift performance of an automatic transmission system having gears, and a torque converter, the system comprising:
an input motor driving the automatic transmission at an input speed while applying a rotational load by a pair of output motors;
a measurement circuit configured to apply a command to a solenoid to change fluid pressure and detect a time when the solenoid command is sent to the solenoid;
the automatic transmission being shifted between a pair of the gears;
a torque meter measuring transmission output torque and outputting torque values;
a controller detecting a threshold value for a torque converter rotation speed;
detecting, by the controller, a threshold value for the transmission output torque;
detecting, by the controller, a lag time between a threshold for a turbine speed and the detected time for the solenoid;
determining, by the controller, an engage time based on the torque threshold value and the turbine speed threshold; and judging, by the controller, the performance of the pair of gears based on the lag time, engage time and a peak of the transmission output torque.

16. The test control system of claim 15, wherein the shifting of the automatic transmission between the pair of gears includes upshifting between gears and downshifting between the gears.

17. The test control system of claim 16, wherein the shifting of the automatic transmission between gears includes a shifting between each pair of adjacent gears in the automatic transmission system.

18. The test control system of claim 15, further comprising shifting of the automatic transmission from neutral to drive and shifting from neutral to reverse, and judging the performance of the automatic transmission in neutral based on the time lag, engage time and a peak of the transmission output torque during the shifting from neutral.

19. The test control system of claim 15, further comprising measuring transmission output torque and obtaining torque values with a torque converter lockup enabled and with a torque converter lockup off, and judging, by the controller, the performance of the automatic transmission based on a time lag to reach minimum output torque from when the solenoid command is first issued.

20. The non-transitory computer-readable storage medium of claim 15, wherein the torque converter includes a turbine and a counter drive, wherein the determining, by the controller, a threshold value for the torque converter rotation speed includes detecting a turbine rotating speed and a counter drive rotating speed, and judging, by the controller, a condition of the torque converter based on the difference between the turbine rotating speed and the counter drive rotating speed.

\* \* \* \* \*